Jan. 3, 1967  F. C. FLECK ETAL  3,295,627
VEHICLE BODY FRONT END STRUCTURE
Filed Aug. 20, 1964  2 Sheets-Sheet 2

INVENTORS
Francis C. Fleck,
Dewan D. Forester, &
Charles W. Morris
BY Herbert Furman
ATTORNEY United States Patent Office 3,295,627
Patented Jan. 3, 1967

3,295,627
VEHICLE BODY FRONT END STRUCTURE
Francis C. Fleck, Pontiac, Dewan D. Forester, Birmingham, and Charles W. Morris, Pontiac, Mich., assignors to General Motors Corporation, Detroit, Mich., a corporation of Delaware
Filed Aug. 20, 1964, Ser. No. 390,876
3 Claims. (Cl. 180—68)

This invention relates to vehicle bodies and more particularly to a front end structure for vehicle bodies.

At the present time most vehicle body front end structures are made up of numerous sheet metal parts or stampings which are welded together to form various subassemblies which are thereafter secured together to provide a support for the radiator, headlamps, parking lights, grille, and other parts of the body front end structure. Various sheet decorative panels, including fenders, hoods and grilles, are required to cover or conceal the subassemblies from view.

The front end structure of this invention provides both a structural support for various vehicle components, such as the radiator, headlamps and parking lights, as well as providing a decorative outer structure for the front end of a vehicle body without requiring numerous parts and subassemblies.

One feature of this invention is that the front end structure is comprised primarily of a first sheet metal member shaped to conform to the desired shape of the front end of the vehicle and a second sheet metal member which is secured to the outer peripheral area of the first member and located in spaced relationship thereto to provide a torus type structure which is extremely rigid and not only serves to provide the entire front end structure of the vehicle but also to mount various vehicle components. Another feature of this invention is that the first member includes an inner body portion which is provided with an opening adapted to receive and to support the radiator. A further feature of this invention is that the first member includes embossments located to each side thereof which provide housings for the headlamp assemblies of the vehicle. Yet another feature of this invention is that the first member includes a depending skirt or flange which provides a grille and which also serves to mount the parking lights of the vehicle. Yet a further feature of this invention is that the depending flange seats upon and is adapted to be secured to the chassis frame rails and that struts or support members are provided to interconnect the upper peripheral area of the first member and the chassis frame rails to securely mount the front end structure on the vehicle chassis. Still another feature of this invention is that the first member includes an inner or central portion which is offset inwardly of the outer peripheral area of the second member so as to be housed therewithin and in turn to house and support both the radiator and the headlamps of the vehicle. Still a further feature of this invention is that the second member has its outer surface shaped so as to conform to the desired exterior contour of the front end of the vehicle to provide a distinct aesthetic appearance thereto.

These and other features of the front end structure of this invention will be readily apparent from the following specification and drawings wherein.

Figure 1:
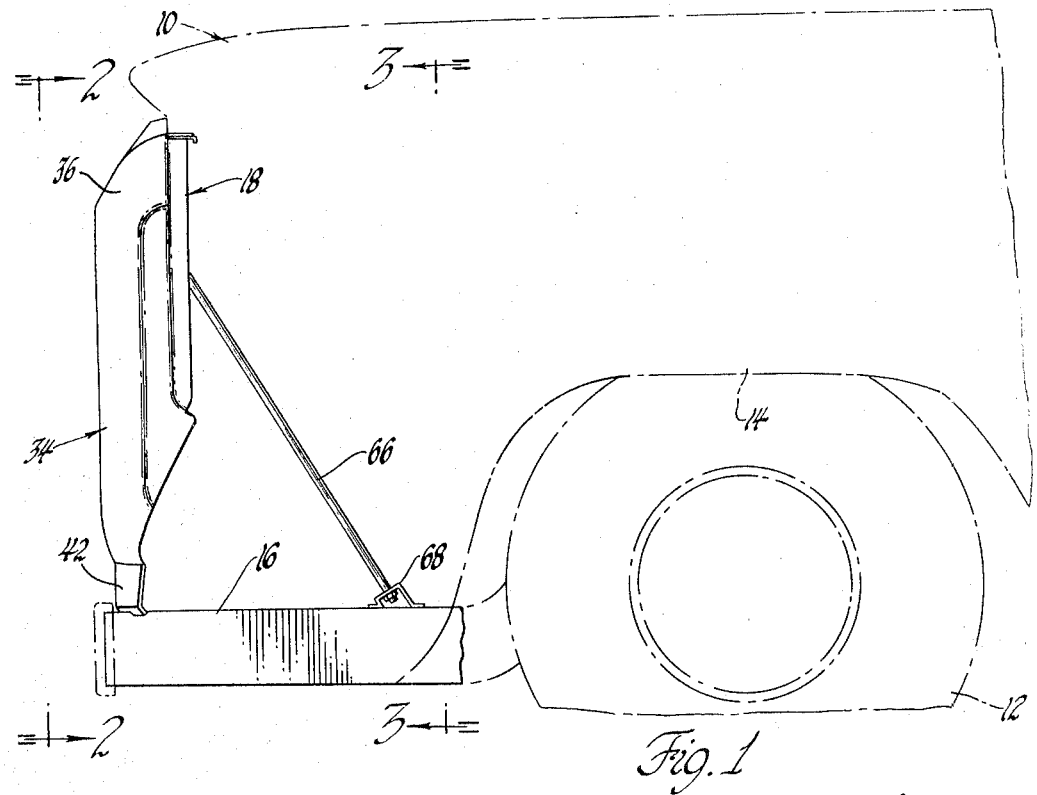
FIGURE 1 is a partial side elevational view of a vehicle embodying a front end structure according to this invention.

Referring now particularly to FIGURE 1 of the drawings, a vehicle 10, which is schematically indicated, includes a pair of front dirigible type wheels 12, a pair of front fenders 14, and a chassis frame which is generally of conventional construction and includes a pair of laterally disposed inwardly opening rails 16 of generally channel shaped configuration.

Figure 2:
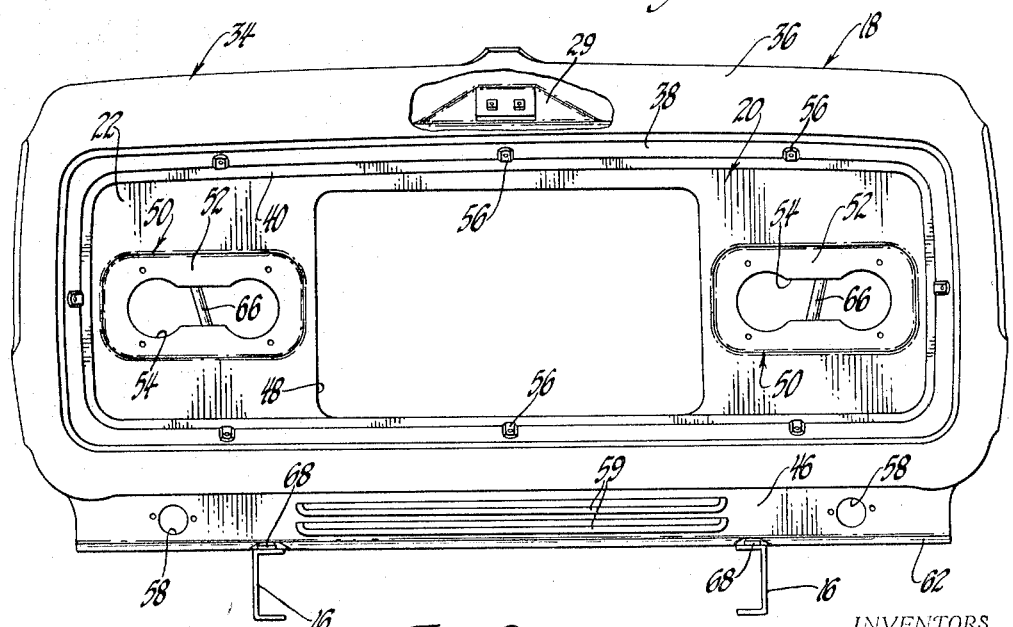
FIGURE 2 is a partially broken away view taken generally along the plane indicated by line 2—2 of FIGURE 1.
Figure 3:
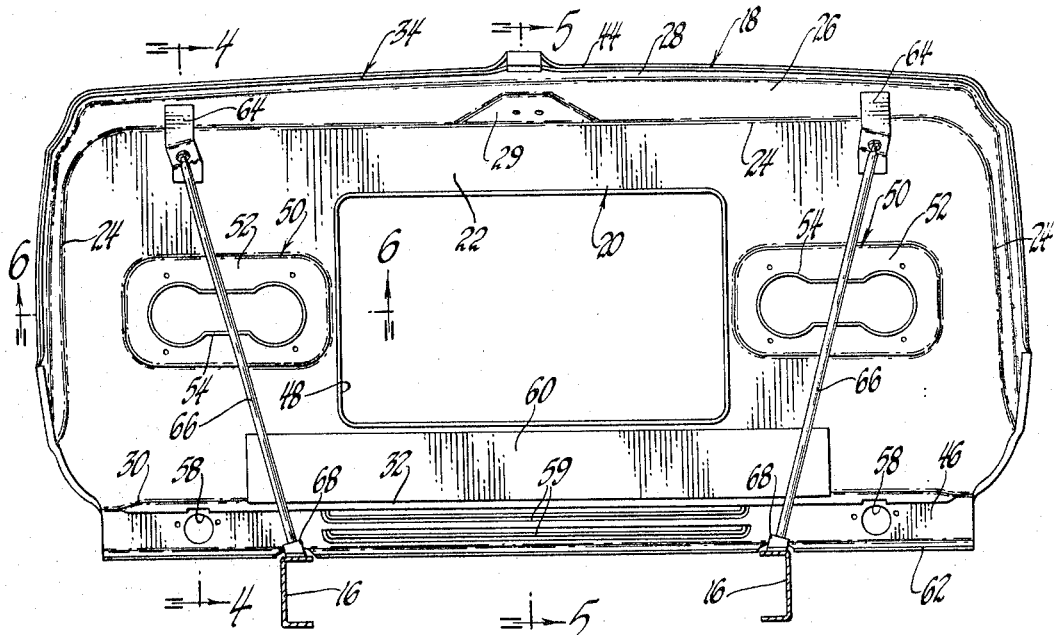
FIGURE 3 is a view taken generally along the plane indicated by line 3—3 of FIGURE 1.

A front end structure 18 according to this invention is secured to the rails 16 adjacent the forward ends thereof. The structure 18 includes an inner sheet metal member 20 having the desired contour of the front end of the vehicle 10, as can be seen in FIGURES 2 and 3. The member 20 includes an inner or body portion 22 provided with a laterally and rearwardly extending peripheral flange 24 along the upper and side edges thereof. Flange 24 merges into a laterally and outwardly extending flange 26 which in turn merges into a laterally and rearwardly extending terminal flange 28. Approximately at the center line of the vehicle, flanges 24 and 26 are offset at a portion 29 thereof and apertured to provide a support for the radiator of the vehicle. A laterally and forwardly extending peripheral flange 30 along the lower edge of the member 20 terminates in a laterally and downwardly extending terminal flange 32.

Figure 4:
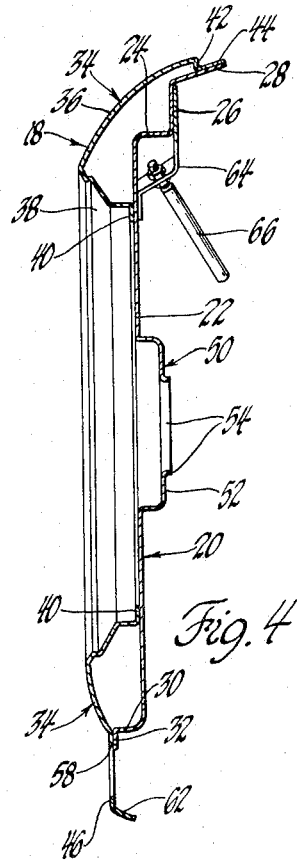
FIGURE 4 is a sectional view taken generally along the plane indicated by line 4—4 of FIGURE 3.
Figure 5:
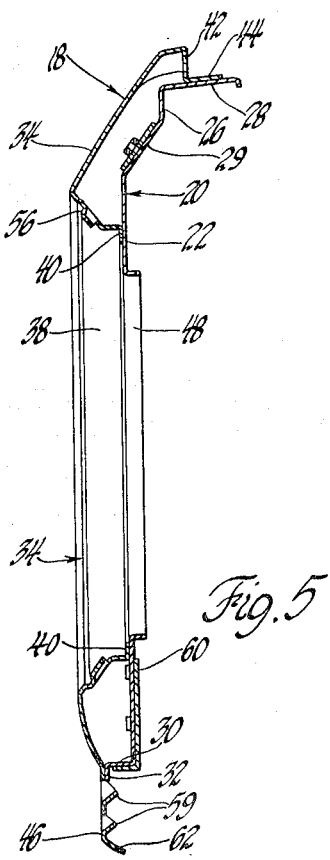
FIGURE 5 is a sectional view taken generally along the plane indicated by line 5—5 of FIGURE 3.
Figure 6:
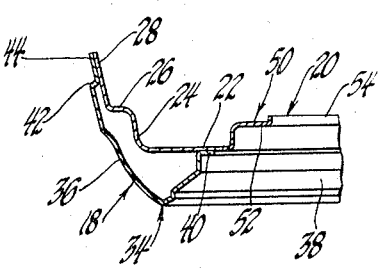
FIGURE 6 is a sectional view taken generally along the plane indicated by line 6—6 of FIGURE 3.

The front end structure further includes a second or outer sheet metal member designated generally 34. As can be seen from FIGURES 4, 5 and 6, member 34 includes a body portion 36, the outer surface of which is shaped to the desired contour or decorative appearance. Member 34 is provided with an inner offset or stepped flange portion 38 which is also decorative in appearance and which terminates in a continuous inwardly extending lateral flange 40 welded or otherwise secured to the body portion 22 of the member 20. The outer upper and side edge portions of the member 34 include an offset flange 42 which terminates in a flange 44 shaped to conform to and mating with the flange 28 of member 20 and being welded or otherwise secured thereto. The lower edge portion of the member 34 is provided with a depending skirt or flange 46 which is welded or otherwise secured adjacent its juncture with the body portion 36 of member 34 to the flange 32 of member 20.

It can be seen that members 20 and 34 thus provide an extremely rigid torus type structure for the front end of the vehicle 10. The major portion of the member 34 is located in spaced relationship to the outer peripheral area of the member 20 to provide a hollow box-like structure therewith which not only defines the torus relationship of the members but adds to the rigidity of the resultant assembly.

The major portion of the body 22 of member 20 is located inwardly of and rearwardly of the flange portion 38 of member 34 and is provided with a central inwardly flanged opening 48 which is intended to receive the radiator of the vehicle. The radiator will be secured to the structure 18 in various manners, certain of which may employ utilization of the portion 30 of the member 20. To each side of the opening 48, the body portion 22 of member 20 is provided with an inwardly embossed or offset portion 50 the base walls 52 of which are apertured and inwardly flanged at 54 to receive the rearward ends or portions of the vehicle headlamp assemblies which are housed within the portions 50 and are secured in a suitable manner to the base walls 52 thereof. The member 20 thus not only supports the headlamp assemblies but also provides a decorative housing for the receipt thereof.

At various places, the flange portion 38 of the member 34 is offset forwardly of the vehicle and apertured to provide support pads or portions 56 for a molding which may be conveniently applied to this area, if desired, to add to the aesthetic appearance of the front end structure. The skirt or flange 46 of the member 34 is apertured at 58 at opposite sides thereof to receive and be secured in a suitable manner to the parking lights of the vehicle. The portion of the skirt 46 intermediate the openings 58 is lanced and offset inwardly to provide decorative grille bars 59 for additional air flow to the radiator of the vehicle. A reinforcing bracket 60 is secured to the body portion 22 of member 20 below and to each side of the opening 48, FIGURE 3.

After the structure 18 has been assembled, it is mounted on the rail 16 of the vehicle by seating the lower flange 62 of the skirt 46 thereon, as shown in FIGURES 1, 2 and 3. The flange 62 may be releasably secured to the rails in any suitable manner. In order to brace the structure 18 and further secure it to the rails 16, a pair of offset apertured brackets 64 are provided on the member 20 at the upper area thereof, with the brackets 64 having the ends thereof secured respectively to the flange 26 of the member 20 and to the body portion 22 thereof generally opposite to the flange 40 of member 34. Adjustable tie rods or support members 66 interconnect the brackets 64 and similar offset brackets 68, FIGURES 1 and 3, which are secured to the rails 16 rearwardly of the front ends thereof in order to additionally secure the structure 18 to the vehicle 10.

Thus, the front end structure of this invention provides both a structural support and a decorative outer structure for the front end of a vehicle. By providing a torus type structure, the front end structure will be extremely rigid so as not only to provide the front end structure of the vehicle but also to support various vehicle components. Generally, the front end structure is made up of a minimum number of parts and replaces various complex parts and assemblies which are presently required for vehicle front end structures. It will be noted that the front end structure further provides the entire front end structure of the vehicle and not just a central area thereof as in many present structures so that the fenders of the vehicle in the front end structure of this invention need only extend thereto but do not provide any part of the front end structure of the vehicle.

Thus, this invention provides an improved front end structure for vehicle bodies.

We claim:
1. In combination with a vehicle body, a front end structure comprising, an inner member generally coextensive in area and shape to the desired area and shape of the front end of the vehicle and including a body portion provided with an outer peripheral flange portion, an outer member generally coextensive in shape to the desired shape of the front end of the vehicle and being provided with inner and outer peripheral flange portions secured respectively to the peripheral flange portion of the inner member and to the body thereof to provide a hollow torus type structural unit therewith continuously bounding the front end of said vehicle, the body portion of said inner member being accessible through said outer member, said inner member being provided with a central opening adapted to house a radiator core and a housing to each side of the opening adapted to receive and support a vehicle headlamp assembly.

2. A front end structure as recited in claim 1 wherein said outer member includes a depending portion along the lower peripheral edge portion thereof which is adapted to seat on a vehicle frame.

3. In combination with a vehicle body, a front end structure comprising, an inner member generally coextensive in area and shape to the desired area and shape of the front end of the vehicle and including a body provided with an outer peripheral edge portion, an outer member having a body overlying an outer portion of the body of the inner member and including an outer peripheral edge portion secured to the outer peripheral edge portion of the inner member, said outer member including an inner peripheral edge portion secured to the body of the inner member inwardly of outer edge portion thereof to provide therewith a hollow, torus-type structure bounding the inner portion of the body of the inner member, the inner portion of the body of the inner member being substantially larger than the outer portion thereof and being readily accessible from the front end of the vehicle, and means on said inner portion for mounting various vehicle components thereon.

References Cited by the Examiner

UNITED STATES PATENTS 3,044,822 7/1962 Dean et al. _____ 180—68 X
3,086,606 4/1963 Schwiering et al. _____ 180—68

FOREIGN PATENTS 347,314 1/1922 Germany.

BENJAMIN HERSH, *Primary Examiner.*

MILTON L. SMITH, *Examiner.*